April 28, 1925.

J. N. ESCANDON

TRACTOR

Filed May 5, 1923

INVENTOR.
J. N. Escandon

BY
Langner, Parry, Card & Langner
ATTORNEYS.

April 28, 1925. 1,535,523
J. N. ESCANDON
TRACTOR
Filed May 5, 1923 2 Sheets-Sheet 2
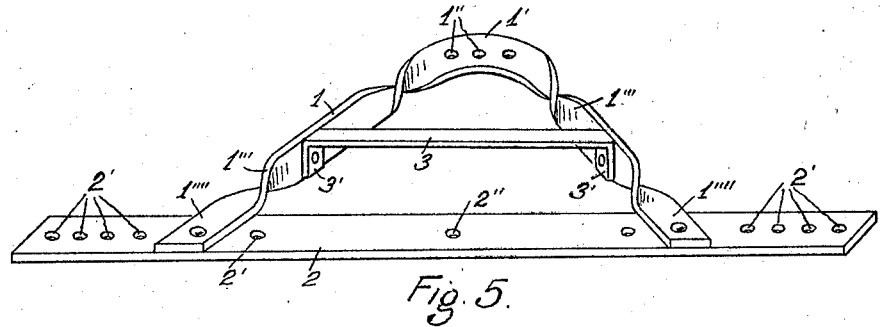
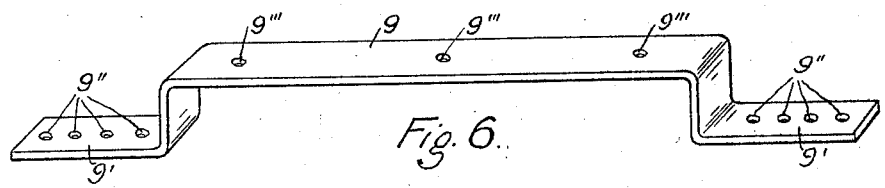
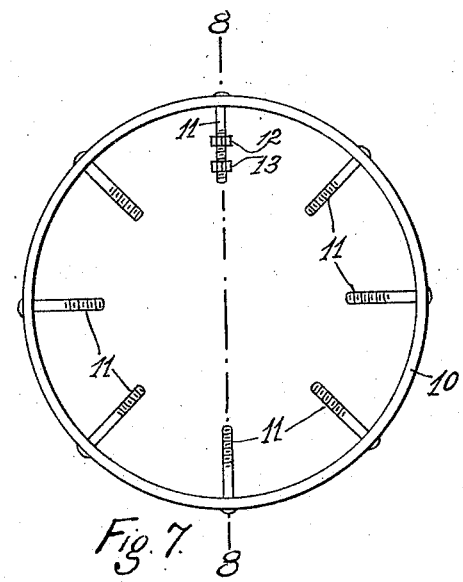
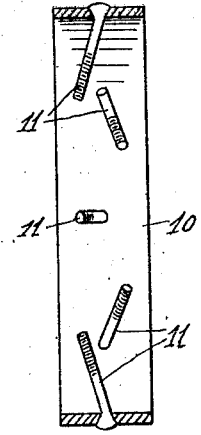
INVENTOR.
J.N. Escandor.
BY
Langner, Parry, Card & Langner
ATTORNEYS.

Patented Apr. 28, 1925.

1,535,523

UNITED STATES PATENT OFFICE.

JESUS NORIEGA ESCANDON, OF PEDRO BETANCOURT, CUBA.

TRACTOR.

Application filed May 5, 1923. Serial No. 636,859.

*To all whom it may concern:*

Be it known that I, JESUS NORIEGA ESCANDON, subject of the King of Spain, residing at 28 Sol Street, Pedro Betancourt, Cuba, have invented certain new and useful Improvements in Tractors, of which the following is a specification.

This invention refers to tractors and has as its principal object an improvement in tractors or motor vehicles used for agricultural work, whose use up to the present has been limited to plowing, harrowing, etc., the earth, and by means of which improvements said tractors can be further used in cultivating the land, especially in the cultivation of cane fields, with great savings in personnel and time.

My invention consists consequently in an engagement or connection between the tractor and two or more cultivators or agricultural implements used for cultivating or cleaning the fields with which is obtained among other inherent advantages that of substituting animal for mechanical power; great rapidness and economy in labor.

Another object of the invention is to provide a wheel or demountable wheel-tire of greater diameter than the tractor wheels and which is secured around these spaced with them; and an auxiliary attachment for the previously mentioned connection all of which permit to regulate the height of the tractor so that it can circulate above the plants even when they have already reached a certain growth.

Other advantages and pertinent considerations of the invention will be deduced in the course of this descriptive memorandum with the aid of the figures in the attached drawings, in which the same characters of reference designate the same parts.

In the drawings:

Figure 5 is a perspective view in detail of the mounting of the connection which constitutes the principal device of the invention.

Figure 6 is a perspective view in detail of the auxiliary member of the connection used in this invention.

Figure 7 is a side elevation of a demountable wheel used as an auxiliary element in this invention.

Figure 8 is a diametrical vertical section according to line 8—8 in Fig. 7.

Figure 1:
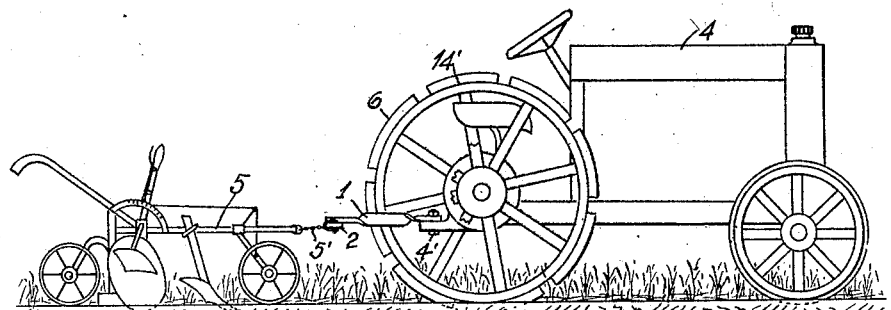
Figure 1 is a side elevation of a Fordson tractor provided with the improvements comprising the object of the present invention.

As shown in Figures 1 to 4 of the drawing and more detailed in Figure 5, this invention consists principally of a connection formed by a triangular frame composed of a plate 1 doubled at its center in the form of an acute angle but with its top 1' of a rounded and flat surrounding having in same three bores slightly spaced from each other 1''. Both branches of the plate 1 starting from the portion of the vertex or top 1' are twisted showing portions 1''' with vertical faces and terminating in flat ends 1'''' which are riveted to a narrow rectangular plate 2 whose ends extend beyond its union with the ends of the plate 1 and showing in them bores 2' slightly spaced lengthwise to the plate 2 and being further provided in this portion between the branches and the plate 1 with three bores 2'' placed in the same lengthwise position as the bores 2' but with more space between them than those.

A tie 3 terminating in vertically downwardly arranged flanges 3' is riveted by these over the flat faces of the portions 1''' of the plate 1.

The described frame constitutes a supplementary attachment or accessory which I apply to the tractors in order to use them in the cultivation of the fields, especially in cane fields.

Figure 2:
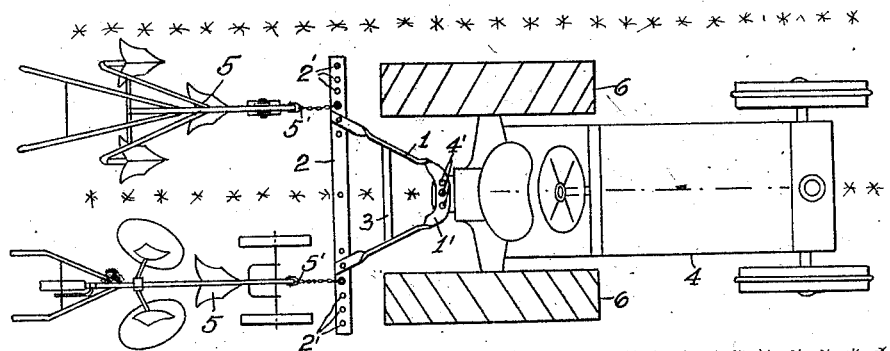
Figure 2 is a flat top view of same.

In Figures 1 and 2 of the drawings is represented a tractor 4, Fordson type, but it is evident that any other adequate type of tractor could be used, fixing to the back head of the tractor the vertex 1' of the plate 1 by means of bolts or pins 4' passing through the bores 1'' of this vertex coinciding with corresponding bores of the tractor head remaining held horizontally the plate or engagement member 2 beyond the back wheels 6 of the tractor. In the bores at each end of the plates 2 is fastened a cultivator or similar agricultural apparatus 5 by means of a flexible connection 5' each cultivator corresponding in longitudinal alineation with the rear wheels 6 of the tractor, the length of the plate 2 is calculated so that the separation between the group of bores 2' at each of its ends be equivalent to the width of a furrow.

By this is understood that on cleaning a field of cane which has been recently planted, the tractor can circulate, resting its wheels on the ridges turned up by the plough on each side of the furrow 8 where the cane is planted and the plough shares of the cultivators 5 will perfectly clean the ridges in all their width of grass, parasites, etc.

When the growth of the cane reaches a height where it prevents progress of the tractor above the furrows I provide auxiliary means or accessories as represented in Figures 6, 7 and 8 of the drawings which permit circulation of the tractor over the plants.

In Figure 6 is represented a narrow rectangular plate 9 of the same length as plate 2 and doubled downwards at its sides to form horizontal flanges 9' provided with bores 9" correspond as seen with the bores 2' of the plate 2 and having in the center of said plate 9 three bores 9"' corresponding with the bores 2" of the plate 2.

In Figures 7 and 8 is shown a demountable wheel-tire 10 of greater diameter than the rear wheels 6 of the tractor, provided radially with spaced bolts 11 fixed therein which have nuts and counter nuts 12 and 13.

Figure 3:
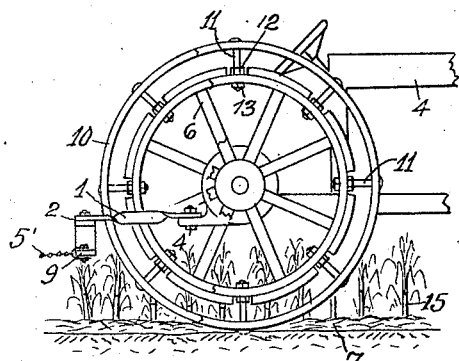
Figure 3 is a partial side elevation of the back part of the tractor showing the applications of the auxiliary means used in this invention.
Figure 4:
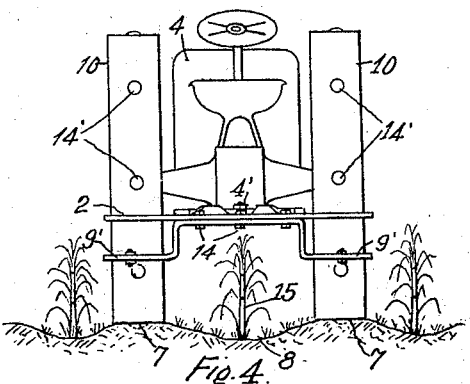
Figure 4 shows a back elevation of same.

The plate 9 as shown in Figures 3 and 4 is placed below the plate 2 so that the holes 9"' coincide with the bores 2" of plate 2 fixing both plates together with bolts 14 and being able to fix in the extreme bores 9" the engagements 5' of the cultivators 5.

The wheel-tires 10 are installed by arranging them in concentrical relation with the back wheels 6 of the tractor passing the bolts 11 through the bores provided previously in the wheels 6 coinciding with said bolts, these wheels remaining between the nuts and counter nuts 12 and 13 of the bolts 11 and these acting as illustrated in Figures 3 and 4 as spacing members of the demountable wheel-tire 10 with regard to the wheel 6 it being evident that the separation between both wheels 6 and 10 will be equivalent to the vertical separation between the ends of the plates or engagement members 9 and 2 with the object of always maintaining the engagement member at a horizontal plane sufficient to adequately connect the cultivators 5.

At the same time the wheel-tires 10 are provided with usual spikes 14 or they can be taken from the interior wheels 6 of the tractor 4 to apply them to the periphery of the demountable wheel-tire 10.

The tractors 4 thus equipped can circulate over the fields even when the plants or shoots 15 have reached certain growth esteeming this growth to be sufficient for the plants not to need any further cleaning or cultivation.

As may be easily understood, especially by those expert in the art to which this invention pertains, the advantages of time and economy gained by being able to apply a tractor to these labors are enormous, it being sufficient to-day that the help plants or cleaning of six hundred furrows in a planted field needs the work of a pair of oxen and a man during twenty days, and this operation can be performed with the use of the tractor in one day only.

Although I have referred to a tractor in this descriptive memorandum, I wish to state that by this word I mean any kind of motor vehicle which may be considered adequate for agricultural labor use.

It should also be noted that it is possible to engage more than two cultivators to the tractor simply by increasing the length of the plates or engagement members 2 and 9 arranging the bores of the engagement 2' and 2" in separations equivalent to the width of a furrow and in the same manner introduce any modification in the re-inforcement or form of the frame.

Therefore it should be understood that I do not limit my right of Letters Patent to what has been previously mentioned, but I wish to reserve the right to make all variations that would be compatible with the substantial idea of the invention which is as claimed in the following.

Claims:

1. A draft attachment, comprising, a connecting head, a draft bar fixed to the head and a plurality of series of apertures in the bar, the series being spaced a distance equal to the width of a furrow, in combination with an adjusting bar, a central offset portion on the adjusting bar, centrally positioned matching apertures in the draft and adjusting bars, and a plurality of series of apertures in the adjusting bar corresponding with said series of apertures in the draft bar.

2. A draft attachment, comprising, a connecting head, a draft bar fixed to the head and a plurality of series of apertures in the bar, the series being spaced a distance equal to the width of a furrow, centrally positioned apertures in said bar, in combination with an adjusting bar connectible to the draft bar, demountable rims for the wheels of a tractor with which the detachment is used, the rims increasing the effective diameters of the wheels, and the adjusting bar maintaining constant the height of the attachment above the ground.

3. A draft attachment, comprising, a connecting head, a draft bar fixed to the head and a plurality of series of apertures in the bar, the series being spaced a distance equal to the width of a furrow, in combination with an adjusting bar, a central offset portion on the adjusting bar, centrally positioned matching apertures in the draft and adjusting bars, and a plurality of series of apertures in the adjusting bar corresponding with said series of apertures in the draft bar, demountable rims for the wheels of a tractor with which the detachment is used, the rims increasing the effective diameters of the wheels, and the adjusting bar maintaining constant the height of the detachment above the ground.

In testimony whereof I have signed my name to this specification.

JESUS NORIEGA ESCANDON.